No. 621,591. Patented Mar. 21, 1899.
L. WEST.
GLASS CUTTING MACHINE.
(Application filed Dec. 9, 1898.)
(No Model.) 2 Sheets—Sheet 1.

Witnesses:
Inventor
Leonard West

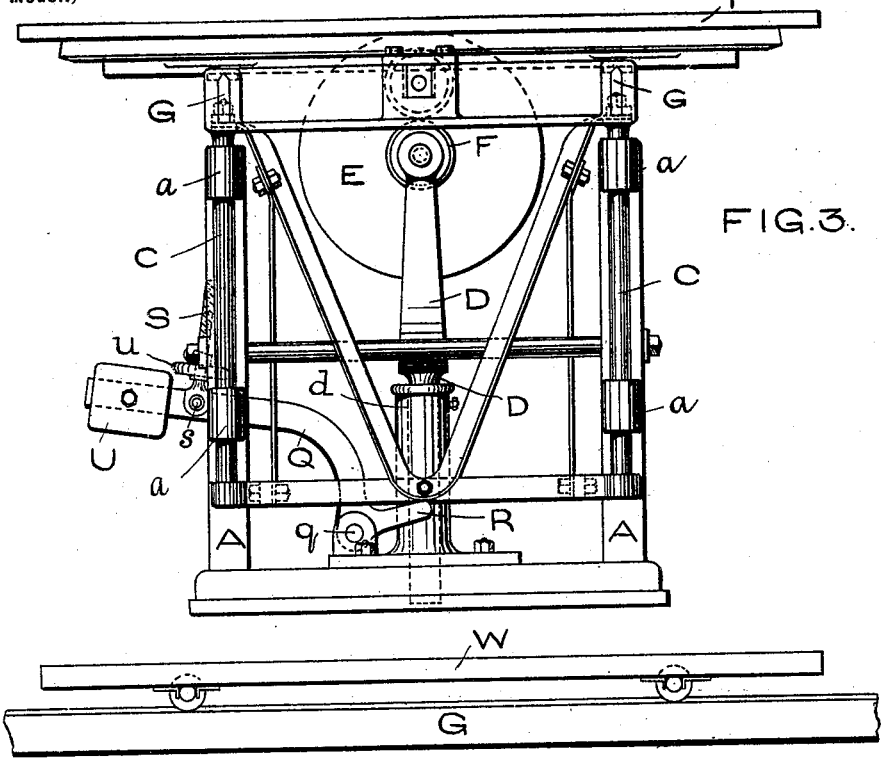

UNITED STATES PATENT OFFICE.

LEONARD WEST, OF ST. HELENS, ENGLAND.

GLASS-CUTTING MACHINE.

SPECIFICATION forming part of Letters Patent No. 621,591, dated March 21, 1899.

Application filed December 9, 1898. Serial No. 698,739. (No model.)

*To all whom it may concern:*

Be it known that I, LEONARD WEST, a subject of the Queen of Great Britain, residing at St. Helens, in the county of Lancaster, England, have invented certain new and useful Improvements in Glass-Cutting Machines, of which the following is a specification.

This invention relates to glass cutting and grinding machines wherein a rotary grinding-wheel and a movable and adjustable glass-carrying table are employed; and it has for its object to provide a machine whereby straight, circular, and volute grooves may be cut in the glass.

In this machine there is a rotative grinding-wheel mounted in a frame which is capable of vertical adjustment, so that wheels of different diameters may be used. There is a strong fixed main frame carrying a vertically-adjustable counterweighted auxiliary frame to regulate the depth of the groove to be cut in the glass, and on this vertically-adjustable frame are mounted tracks capable of supporting tables on which the glass rests, whereby straight, circular, and volute grooves may be cut, as will be hereinafter more particularly described.

Figure 1:
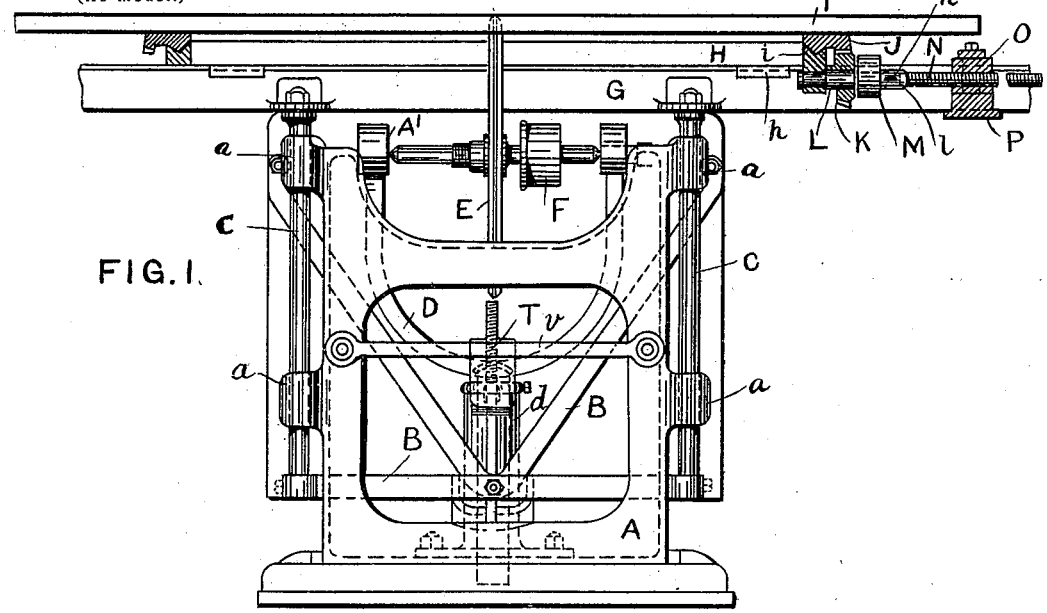
Figure 2:
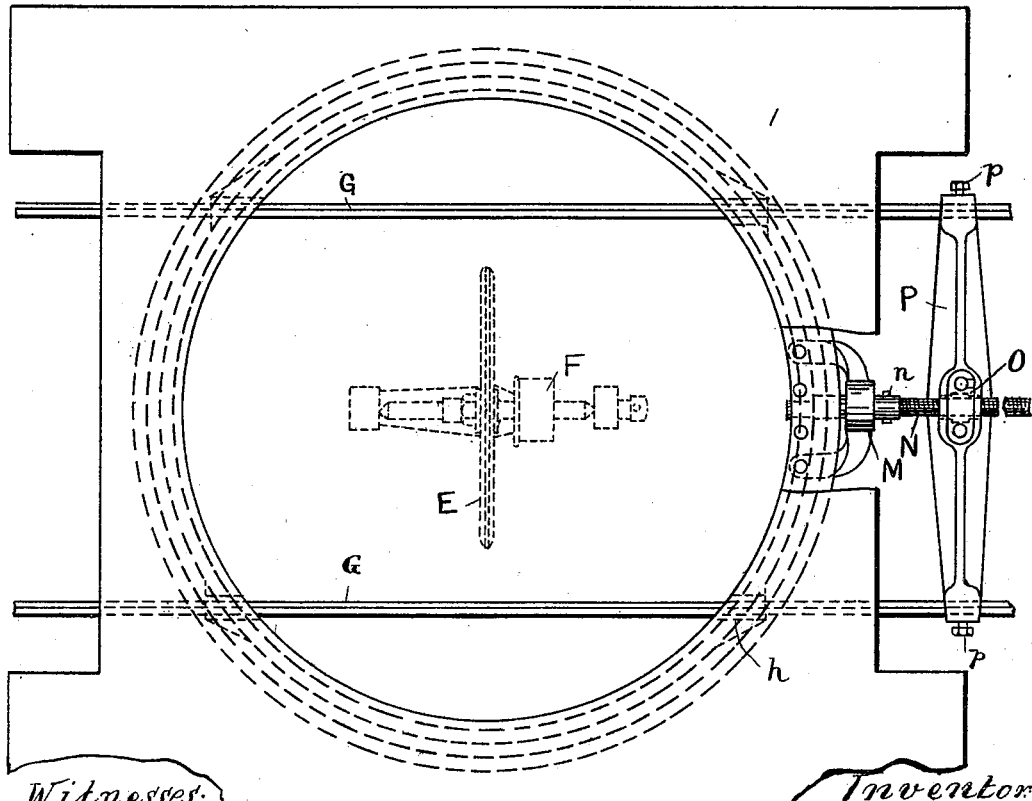

In the accompanying drawings, which illustrate an embodiment of the invention, Figure 1 is a front elevation of the machine, some of the upper parts being in vertical section, taken at the center of the machine. Fig. 2 is a plan of the machine. Fig. 3 is a side elevation thereof. Fig. 4 is a side elevation, and Fig. 5 a plan, of a table which may be used for cutting straight grooves only.

Referring first to Figs. 1, 2, and 3, A is a strong fixed supporting-frame of any suitable form, and B is a vertically-adjustable auxiliary frame having upright guide-rods C, which slide in keeper guides or bearings $a$ on the fixed frame A. This frame B and the parts carried thereby may be raised through the medium of an elbow-lever Q, Fig. 3, fulcrumed in the main frame at $q$ and having a short arm R, taking under the frame B. This lever Q is provided with a weight U to partially counterbalance the weight of the parts. The height of the auxiliary frame B is regulated by means of a screw S, coupled at $s$ to the lever Q and extending up through a hole in a bar T, Fig. 1, on the main frame A, a nut-wheel $u$ on the screw S bearing against the under side of the bar T.

Fixed on top of the frame B are two parallel tracks G, and mounted slidably on these tracks is a ring-track H, which has suitable keepers $h$ to keep it in place on the tracks G and permit the ring-track to be moved along the straight tracks G. On the ring-track H is mounted a glass-supporting table I, which is cut away at the center, Fig. 2, and has on its under side a ring-bearing $i$, which may be V-shaped, as seen in Fig. 1, to fit into a V-groove in the ring-track H. This construction, as will be seen, permits the table I to turn or rotate in a horizontal plane on the ring-track H.

On the outer face of the ring-bearing I is formed an annular rack J, the teeth of which engage those of a pinion K, fixed on a shaft L, which has a bearing at its inner end in the ring-track H and at its outer end in a bracket M. This shaft projects radially from the track H, and a screw N, alined axially with it, fits in a socket $l$ in the shaft and is secured to the latter by a removable cotter $n$. The screw N screws through a nut O, mounted detachably on a bridge-piece P, secured at its respective ends to the straight tracks G by screws $p$ or the like.

E is the grinding-wheel, the arbor of which is mounted in bearings A' in a frame D, which has a foot-spindle set in a tubular bearing or socket $d$, whereby the frame D may be set higher or lower within limits to suit grinding-wheels E of different sizes and to allow of rotative adjustment.

F is the driving-pulley on the arbor of the wheel E.

The operation is as follows: The plate of glass is placed on the table I and secured there by any convenient means. The frame B is lowered by the nut-wheel $u$ until the wheel E will cut to the desired depth for the groove required. If a simple circular groove is to be cut, the screw N is detached and removed and the circular track H moved along the straight tracks G until it has the proper amount of eccentricity with the grinding-wheel E. The table I is now rotated, and the wheel E cuts a circular groove in the glass. If the first cut be not deep enough, the frame B may be lowered and a second cut made.

If a groove of volute form is to be cut, a screw N and nut O of the desired pitch are put in place and the table I moved by rotation of the screw N. This imparts through the pinion K a rotary motion to the table I and simultaneously a radial movement thereto in a straight line, the resultant being a volute. When it is desired to cut straight grooves, obviously this might be done by removing the screw N and moving the table I along the straight tracks G; but it is preferred to remove all the parts above the tracks G and mount on said tracks the carriage or table W. (Seen in Figs. 4 and 5.) There may be a plurality of grinding-wheels E placed abreast on the wheel-arbor; but only one is shown in the drawings. The bearings where the ring H rests on the tracks G may be rolling bearings—similar to those seen in Fig. 4, for example—and the same may be said of the bearings where the ring $i$ rests on the ring H; but this is not important to the present invention. As the glass being cut is transparent, the operator can readily move or adjust the supporting-table, so as to follow the pattern, and, if desired, he can regulate the depth of the cut to some extent by pressure of his foot on the treadle-lever Q, which raises the table I.

Having thus described my invention, I claim—

1. In a machine for cutting glass, the combination with the grinding-wheel and its arbor, of the frame D in which said arbor is rotatively mounted, and the fixed, socketed bearing, said frame having a foot-spindle mounted adjustably in the socket, whereby the frame may be rotatively and vertically adjusted, substantially as set forth.

2. In a glass-cutting machine, the combination of a glass-carrying table, adjustable vertically and capable of horizontal movement so as to follow the lines of a given design, a revolving guider rigidly held below said table, and an adjusting device, whereby the relative heights of the surface of the table and of the grinder can be adjusted, substantially as described.

3. The combination of the stationary frame A, the vertically-adjustable frame B, mounted thereon, the horizontally-traveling table carried on the frame B, and having a face at right angles to said adjustment, means for giving the table rotary and horizontal reciprocating movements, a stationary but rotating grinder, and means for adjusting the table so that the glass thereon shall come down on the cutter, substantially as described.

4. In a machine for cutting glass, the combination, with a rotary grinder, the horizontal rails G, the ring-track H, movable on the said rails, and the table I, rotatable on said track H, of means for regulating the distance of the grinder from the surface of the table I, substantially as and for the purposes described.

5. In a machine for cutting glass, the combination of the wheel E, the table I, adjustable in height over the said wheel, and means for giving said carriage both a rotary and a rectilineal horizontal movement, substantially as described.

6. The combination of the stationary, main frame A, the frame B adjustable vertically thereon, with the lever Q, having an arm R, and the screw-adjusting device U, S, substantially as described.

7. In a glass-cutting machine, the combination with the stationary frame A, a vertically-adjustable frame B, mounted thereon and carrying the glass-supporting mechanism, and a partially-counterweighted treadle device under the frame B, of the screw-adjustment device, acting against the weight, whereby while the adjustable frame is prevented from falling below a given adjustable point, it may be freely raised above that point, substantially as described.

8. In a machine for cutting straight and curved lines on glass, the combination with the fixed, main frame, the frame D, mounted adjustably on the main frame, the grinding-wheel rotatively mounted in said frame D, the auxiliary frame B, mounted in vertical guides on the main frame, the weighted treadle-lever under the frame B, and a screw-adjusting device for regulating the depression of said frame B, of the straight tracks G, fixed on the frame B, and a glass-supporting table mounted on said tracks G and adapted for horizontal movement along said tracks, substantially as set forth.

In witness whereof I have hereunto signed my name, this 22d day of November, 1898, in the presence of two subscribing witnesses.

LEONARD WEST.

Witnesses:
BENJAMIN HOULDSWORTH LOMAX,
ARTHUR HILTON LOMAX.